US010151299B2

(12) United States Patent
Petersen et al.

(10) Patent No.: US 10,151,299 B2
(45) Date of Patent: Dec. 11, 2018

(54) METHOD FOR STARTING A WIND TURBINE IN A COLD CLIMATE ENVIRONMENT

(71) Applicant: Vestas Wind Systems A/S, Aarhus N. (DK)

(72) Inventors: Knud Erik Petersen, Holstebro (DK); Janne-Pekka Yrjönen, Aarhus C (DK)

(73) Assignee: Vestas Wind Systems A/S, Aarhus N. (DK)

( * ) Notice: Subject to any disclaimer, the term of this patent is extended or adjusted under 35 U.S.C. 154(b) by 13 days.

(21) Appl. No.: 14/787,640

(22) PCT Filed: Apr. 25, 2014

(86) PCT No.: PCT/DK2014/050110
§ 371 (c)(1),
(2) Date: Oct. 28, 2015

(87) PCT Pub. No.: WO2014/177151
PCT Pub. Date: Nov. 6, 2014

(65) Prior Publication Data
US 2016/0076515 A1    Mar. 17, 2016

(30) Foreign Application Priority Data

Apr. 29, 2013    (DK) .................................. 2013 70233

(51) Int. Cl.
*F03D 7/02*      (2006.01)
*F03D 9/00*      (2016.01)
(Continued)

(52) U.S. Cl.
CPC .......... *F03D 7/026* (2013.01); *F03D 1/0666* (2013.01); *F03D 9/22* (2016.05); *F03D 9/255* (2017.02);
(Continued)

(58) Field of Classification Search
CPC . F03D 7/06; F03D 9/006; F03D 7/026; F05B 2260/20
See application file for complete search history.

(56) References Cited

U.S. PATENT DOCUMENTS 8,887,868 B2 * 11/2014 Takayanagi ............. F03D 7/026
184/4
2009/0001723 A1 * 1/2009 Nitzpon .................. F03D 7/026
290/44
(Continued)

FOREIGN PATENT DOCUMENTS

DE    102009055784 A1     5/2011
EP       2672112 A1 * 12/2013 .......... F03D 11/0008
WO    WO 2011064040 A1 *  6/2011 .......... F28D 20/0043
WO       2012028145 A1     3/2012

OTHER PUBLICATIONS

Danish Patent and Trademark Office, Search Report issued in Application No. PA 2013 70233 dated Feb. 10, 2014.
(Continued)

*Primary Examiner* — Tulsidas C Patel
*Assistant Examiner* — Joseph Ortega
(74) *Attorney, Agent, or Firm* — Wood Herron & Evans LLP

(57) ABSTRACT

A method of starting a wind turbine in a cold climate environment includes providing a wind turbine in the cold climate environment in a stand-still or near stand-still condition; allowing the rotation speed of the rotor to increase during start up of the wind turbine; optimizing heat generation within the gear box; and generating power using the wind turbine, wherein heat generation within the gear box is optimized prior to providing the generated electrical power to an electrical grid. Optimizing heat generation within the gear box may include maximizing internal power losses in the gear box during start up. This may allow the start up to be achieved without using external heaters. Aspects of this
(Continued)

method may be used during periods of low wind conditions in cold climate environments so that once sufficient wind conditions are reestablished, the wind turbine is ready for immediate power production.

17 Claims, 3 Drawing Sheets

(51) Int. Cl.
  *F03D 11/02* (2006.01)
  *F03D 1/06* (2006.01)
  *F03D 15/10* (2016.01)
  *F03D 15/00* (2016.01)
  *F03D 9/22* (2016.01)
  *F03D 9/25* (2016.01)
  *F03D 80/60* (2016.01)

(52) U.S. Cl.
  CPC ............. *F03D 15/00* (2016.05); *F03D 15/10* (2016.05); *F03D 80/60* (2016.05); *F05B 2260/4031* (2013.01); *F05B 2270/101* (2013.01); *F05B 2270/303* (2013.01); *Y02E 10/721* (2013.01); *Y02E 10/723* (2013.01); *Y02E 10/725* (2013.01)

(56) References Cited

U.S. PATENT DOCUMENTS

| | | | |
|---|---|---|---|
| 2010/0034653 A1* | 2/2010 | Frokjaer | H05K 7/20927 416/39 |
| 2010/0140937 A1* | 6/2010 | Kirchner | F03D 7/026 290/44 |
| 2011/0012353 A1* | 1/2011 | Kamata | F03D 80/70 290/44 |
| 2011/0140418 A1* | 6/2011 | Matsuo | F03D 80/80 290/44 |
| 2011/0140423 A1* | 6/2011 | Menke | F03D 7/0224 290/44 |
| 2011/0204633 A1* | 8/2011 | Takayanagi | F03D 7/026 290/44 |
| 2011/0299247 A1* | 12/2011 | Zhang | H02P 6/16 361/695 |
| 2012/0269625 A1 | 10/2012 | Sabhapathy | |
| 2013/0236308 A1* | 9/2013 | Tietze | F03D 7/026 416/1 |
| 2015/0075210 A1* | 3/2015 | Reznik | F01K 3/185 62/467 |

OTHER PUBLICATIONS

European Patent Office, International Search Report and Written Opinion issued in International Application No. PCT/DK2014/050110 dated Jun. 20, 2014.

* cited by examiner

METHOD FOR STARTING A WIND TURBINE IN A COLD CLIMATE ENVIRONMENT

TECHNICAL FIELD

The invention relates generally to a wind turbine and more particularly, to an improved method for starting a wind turbine or operating a wind turbine in a cold climate environment.

BACKGROUND

Wind turbines are used to produce electrical energy using a renewable resource and without combusting a fossil fuel. Generally, a wind turbine converts kinetic energy from the wind into mechanical energy and then subsequently converts the mechanical energy into electrical power. A horizontal-axis wind turbine includes a tower, a nacelle located at the apex of the tower, and a rotor that is supported in the nacelle. The rotor is coupled with a generator for converting the kinetic energy of the blades to electrical energy.

Wind turbines have been placed in many locations around the world having a sufficient supply of wind to make operation of the wind turbine feasible. In some cases, excellent wind conditions for wind turbine operation occur where the local climate may be particularly harsh. By way of example, many cold climate environments, such as that provided in the Arctic and other cold regions, have wind conditions conducive to wind turbine operation. Indeed, wind turbines are already located in such cold climate environments and it is expected that the number of wind turbines in such environments will continue to increase.

It is known that there are some drawbacks to locating wind turbines in such cold climate environments. For example, the start up of a wind turbine from, for example, a stand-still condition in a cold climate environment has some special considerations. In this regard, care must be taken not to damage various components of the wind turbine during start up. One particular area of concern is with the gear box in the drive train of wind turbines. The gear box contains many moving parts (gears, bearings, etc.) and typically includes an oil or other lubricant for reducing friction and facilitating efficient operation of the gear box. The gear box may be relatively large (e.g., on the order of 20 tons) with a significant amount of oil and it may be important to have the gear box sufficiently warmed prior to bringing the wind turbine up to its nominal operational state.

In many current gear box designs, warming of the gear box may be achieved by incorporating one or more heaters into the gear box. Of course, the heaters are configured to slowly heat the oil and gear box so as to bring the viscosity of the lubricant to levels that help prevent excessive wear and damage to the moving components of the gear box during start up. While the gear box heaters are conventionally considered to be successful for their intended purpose, the thermal aspects of the gear box are not generally well understood during a start up procedure. In other words, the effectiveness of the heaters on the gear box during start up is generally assumed without a good understanding of their true impact. However, the heaters are generally costly and thus increase the overall cost of the wind turbine. Maintenance of the heaters may also be a source of cost. Additionally, conventional gear box heaters and start up procedures result in a significant amount of warm up time before the wind turbine reaches its nominal operating state. This may represent a loss of valuable power production time.

Thus, there is a need for an improved method or procedure for starting a wind turbine in a cold climate environment that addresses these and other short comings of existing designs and procedures. More particularly, there is a need for a method for starting a wind turbine in a cold climate environment that decreases the amount of warm up time in order to reach the wind turbine's nominal operating state.

SUMMARY

A method of starting a wind turbine in a cold climate environment includes providing a wind turbine in a cold climate environment in a stand-still or near stand-still condition, wherein the wind turbine has a tower, a rotor with at least one blade, a generator for producing electrical power, and a gear box having a main shaft operatively coupled to the rotor and a high speed shaft operatively coupled to the generator, the wind turbine configured to be operatively connected to an electrical grid; allowing the rotation speed of the rotor to increase during start up of the wind turbine; optimizing heat generation within the gear box; and generating electrical power using the wind turbine, wherein heat generation within the gear box is optimized prior to providing the generated electrical power to the electrical grid.

In one embodiment, optimizing heat generation within the gear box comprises maximizing internal power losses in the gear box prior to providing the generated electrical power to the electrical grid. Furthermore, in one embodiment, maximizing the internal power losses in the gear box comprises controlling the rotation speed of the rotor so that the internal power losses in the gear box are maximized prior to providing the generated electrical power to the electrical grid. In this regard, Applicants have discovered a general correlation between the internal power losses in the gear box and the rotational speed of a wind turbine's high speed shaft, which in turn is determined by the rotational speed of the rotor. Controlling the rotational speed of the rotor with this correlation in mind heats the gear box in an optimal manner during a start up procedure. By way of example, in an exemplary embodiment, maximizing the internal power losses in the gear box further comprises controlling the rotation speed of the rotor so that a substantially linear relationship exists between a rotation speed of the high speed shaft and the gear box temperature during start up of the wind turbine. In one embodiment, there may be a first region of the start up having a substantially linear relationship between the rotation speed of the high speed shaft and the gear box temperature characterized by a first slope, and a second region of the start up having a substantially linear relationship between the rotation speed of the high speed shaft and the gear box temperature characterized by a second slope, wherein the first and second slopes are different from each other.

Moreover, controlling the rotation speed of the rotor to produce the substantially linear relationship may terminate when the temperature of the gear box reaches a first threshold temperature. Additionally, the rotation speed of the high speed shaft may be greater than about 60% of the nominal operating speed of the high speed shaft when the temperature of the gear box reaches the first threshold temperature. In one embodiment, the rotation speed of the high speed shaft may be increased up to a nominal operating speed when the temperature of the gear box reaches the first threshold temperature. Furthermore, power production of the wind turbine may be increased, such as being stepped up, to a nominal power output when the temperature of the gear box reaches the first threshold temperature. In one embodiment, the rotation speed of the high speed shaft may be at a nominal operating speed prior to or simultaneous with producing power with the wind turbine. The method may further include minimizing the internal power losses in the gear box when the wind turbine starts generating power or reaches the first threshold temperature. In one aspect in accordance with the method, heat generation in the gear box may be achieved using only the energy resulting from the rotation of the wind turbine rotor. In this regard, the heat generation in the gear box may be achieved without the use of external heaters.

In another embodiment, a method of starting a wind turbine in a cold climate environment comprises providing a wind turbine in a cold climate environment in a stand-still or near stand-still condition, wherein the wind turbine has a tower, a rotor with at least one blade, a generator for producing electrical power, and a gear box having a main shaft operatively coupled to the rotor and a high speed shaft operatively coupled to the generator, the wind turbine configured to be operatively connected to an electrical grid; allowing the rotation speed of the rotor to increase during start up of the wind turbine; with the rotor turning and prior to the wind turbine providing electrical power to the electrical grid, increasing the temperature of the gear box up to a first threshold temperature without the use of external heaters; and generating electrical power using the wind turbine after the temperature of the gear box has reached the first threshold temperature.

In this method, increasing the temperature of the gear box may further comprise maximizing the internal power losses in the gear box during the start up to the first threshold temperature. In a further embodiment, maximizing the internal power losses in the gear box further comprises controlling the speed of the rotor such that a substantially linear relationship exists between a rotation speed of the high speed shaft and the gear box temperature during the start up to the first threshold temperature.
The method may further include minimizing the internal power losses in the gear box when the temperature of the gear box reaches the first threshold temperature.

In still another embodiment, a method of operating a wind turbine in a cold climate environment includes providing a wind turbine in a cold climate environment in a fully operating state, the wind turbine providing electrical power to an electrical grid when in the fully operating state, wherein the wind turbine has a tower, a rotor with at least one blade, a generator for producing electrical power, and a gear box having a main shaft operatively coupled to the rotor and a high speed shaft operatively coupled to the generator; interrupting the supply of electrical power from the wind turbine to the electrical grid during a period of low wind conditions; optimizing heat generation within the gear box during the period of low wind conditions; and reestablishing the supply of electrical power from the wind turbine to the electrical grid once the period of low wind conditions has terminated. For example, the supply of electrical power from the wind turbine to the electrical grid may be reestablished after the low wind conditions without executing a start up sequence for the wind turbine.

BRIEF DESCRIPTION OF THE DRAWINGS

The accompanying drawings, which are incorporated in and constitute a part of this specification, illustrate an embodiment of the invention and, together with a general description of the invention given above, and the detailed description given below, serve to explain the invention.

DETAILED DESCRIPTION

Figure 1:
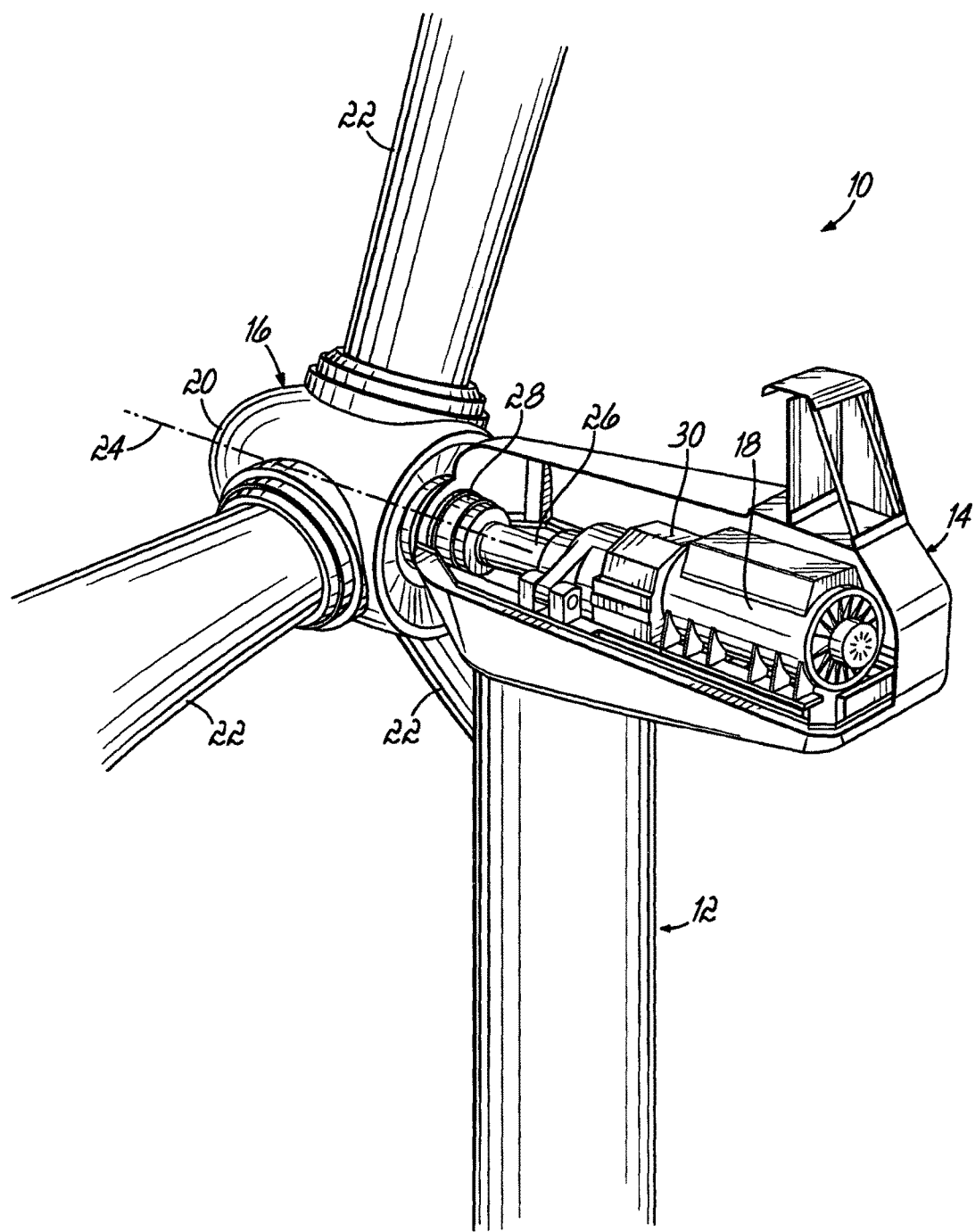
FIG. 1 is a partially torn away perspective view of a wind turbine in accordance with an embodiment of the invention.

With reference to FIG. 1 and in accordance with an embodiment of the invention, a wind turbine 10 includes a tower 12, a nacelle 14 disposed at the apex of the tower 12, and a rotor 16 operatively coupled to a generator 18 housed inside the nacelle 14. In addition to the generator 18, the nacelle 14 houses miscellaneous components required for converting wind energy into electrical energy and various components needed to operate, control, and optimize the performance of the wind turbine 10. The tower 12 supports the load presented by the nacelle 14, the rotor 16, the generator 18 and other components of the wind turbine 10 that are housed inside the nacelle 14. The tower 12 of the wind turbine 10 also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a direction substantially perpendicular to the wind direction. The rotor 16 of wind turbine 10 includes a central hub 20 and at least one blade 22 that projects outwardly from the central hub 20. In the representative embodiment, the rotor 16 includes three blades 22 at locations circumferentially distributed thereabout, but the number may vary.
The blades 22 are configured to interact with the passing air flow to produce lift that causes the central hub 20 to spin about a longitudinal axis 24. The design and construction of the blades 22 are familiar to a person having ordinary skill in the art and will not be further described. For example, each of the blades 22 may be connected to the central hub 20 through a pitch mechanism (not shown) that allows the blades to pitch under control of a pitch controller.

The rotor 16 may be mounted on an end of a main drive shaft 26 that extends into the nacelle 14 and is rotatably supported therein by a main bearing assembly 28 coupled to the framework of the nacelle 14. The main drive shaft 26 is operatively coupled to one or more gear stages, which may be in the form of a gear box 30, to produce a more suitable mechanical input to the generator 18 located in the nacelle 14. The gear box 30 relies on various gear arrangements to provide speed and torque conversions from the rotation of the rotor 16 and main drive shaft 26 to the rotation of a secondary drive shaft (not shown) that operates as an input to the generator 18. The secondary drive shaft is often referred to as the high speed shaft (HSS). By way of example, the gear box 30 may transform the relatively low rotational speed of the main drive shaft 26 to a relatively high rotational speed of the high speed shaft which is mechanically coupled to the generator 18. The electrical power produced by generator 18 is provided to an electrical grid to which the wind turbine 10 is operatively connected.

Figure 2:
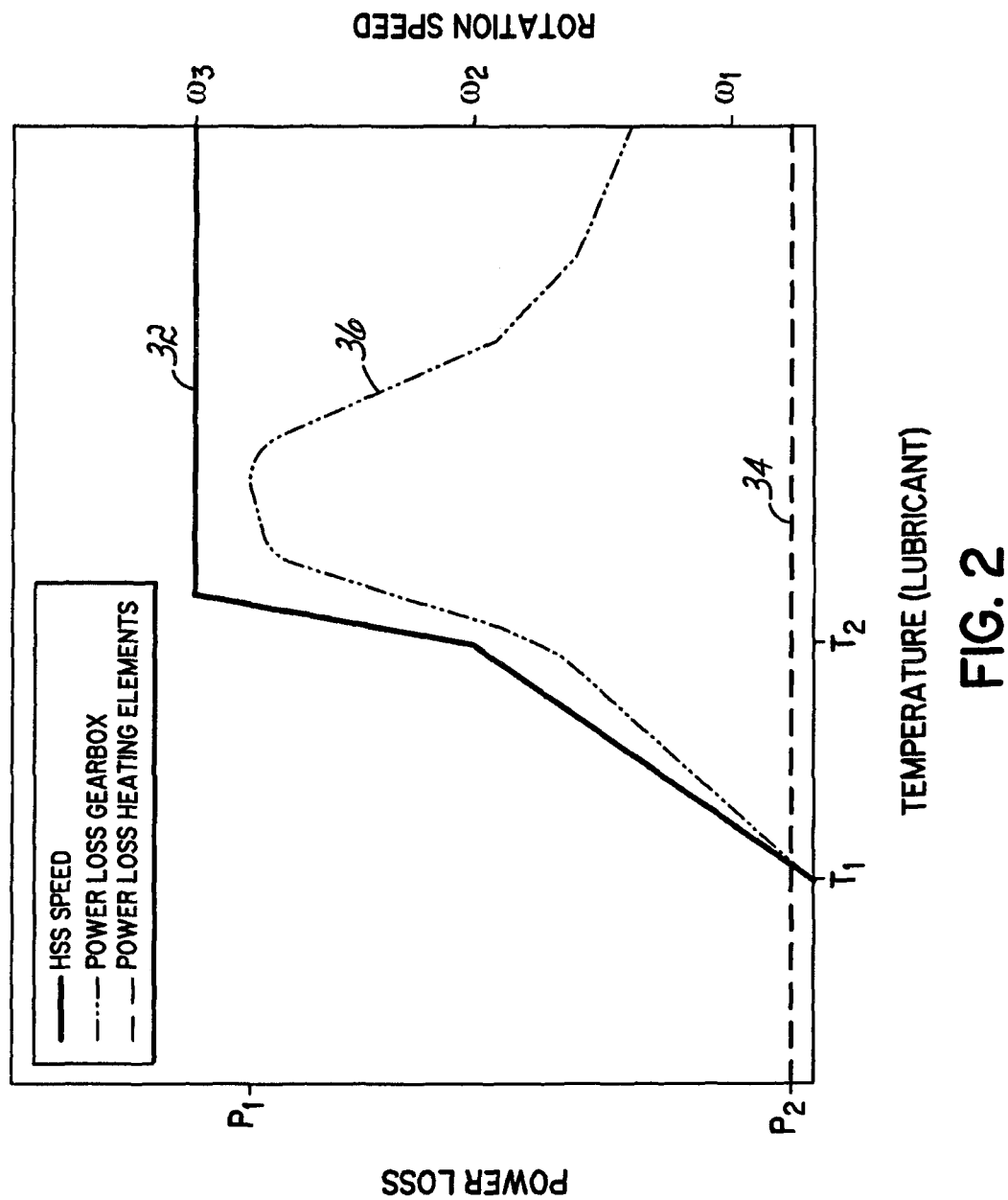
FIG. 2 is a schematic diagram of heating element power and total power losses inside the gear box during a start up procedure of the wind turbine.

Conventional start up procedures for wind turbines in cold climate environments include using heaters in the gear box. As used herein, cold climate environments are those environments having an ambient temperature on the order of 0° C. or below at the time of startup. As noted above, however, the effectiveness of the heaters on the thermal state of the gear box is not particularly well understood. Applicants submit that there may be several sources of heating during start up in addition to that provided by the heaters. For example, internal power losses from friction, contact losses, etc. in the gear box itself may contribute a significant amount of heating to the gear box. These internal power losses may be associated with losses in the bearings, losses due to oil splashing, losses in the gears, and/or losses with other aspects of the gear box 30. FIG. 2 is a schematic diagram of certain internal power losses during startup of a wind turbine. In this figure, line 32 represents the rotational speed of the high speed shaft; line 34 represents the power losses from the heaters or heating elements; and line 36 represents the internal power losses from the gear box. This figure demonstrates several important points relevant to aspects of the present invention.

One point is that the contribution of the heating elements (line 34), as compared to gear box internal power losses (line 36), on the overall heating of the gear box is relatively small. In other words, the internal power losses in the gear box itself may provide a significant portion of the heating to the gear box during a start up procedure. This tends to suggest, for example, that it may indeed be possible to remove the heaters from the gear box and provide a start up procedure that is effective for increasing the temperature of the gear box (as indicated, for example, by the gear box lubricant temperature). Depending on the particular start up procedure, for example, it may be possible to remove the heaters from the gear box, thereby reducing the costs associated with the gear box and the overall wind turbine.

Another take away point from FIG. 2 is that the internal power losses from the gear box appear to track with the speed of the high speed shaft, which, in turn, is dictated by the rotation speed of the wind turbine rotor.

Thus, the gear box internal power losses increase as the speed of the high speed shaft increases toward its nominal operating speed. This might suggest, for example, that the start up procedure should proceed immediately to the nominal operating speed of the high speed shaft via a step or quick ramp up. However, it should be noted that once the nominal operating speed of the high speed shaft is reached, the internal power losses in the gear box start decreasing (e.g., see the right portion of line 36 in FIG. 2). It is believed that the decrease in the internal power losses at high rotational speeds is due to the lowered viscosity of the lubricant and decreased lubricant level inside the gear box due to the lubricant being splashed on the walls of the gear box and taking a longer time to return to the gear box sump.

It is believed that a quick ramp up to the high nominal operating speed results in local heating of the gear box, primarily at the points where the losses are greatest (e.g., the teeth of the gears) and this heating spreads globally by conduction heat transfer stemming from the site of local heating. This is generally considered to be an inefficient way to heat the gear box. It is more preferred that the lubricant (e.g., oil), in essence, becomes the vehicle for heating the gear box. More particularly, it is believed that the lubricant picks up the heat from the local power loss sites and transfers it to the sump, which provides the greatest surface area for spreading the heat globally to the gear box. This is considered a more efficient method of heating the gear box and requires good lubricant flow in the gear box.

With a better understanding as to the internal power losses in the gear box and how those losses provide heat to the gear box, a number of observations may be made. First, the internal power losses generated in the gear box are a significant source of heating to the gear box during start up. In this regard, it is believed that if the start up procedure is done properly, heaters will not have to be used at all. Additionally, while internal power losses track with the rotation speed of the high speed shaft, there may be good reasons not to quickly ramp up to the nominal operating speed of the high speed shaft. More particularly, Applicants' analysis indicates that there may well be an ideal region or procedure for reaching the nominal operating state of the wind turbine. For example, if one increases the rotation speed of the high speed shaft too quickly during start up, internal power losses in the gear box start decreasing, thereby reducing heating of the gear box. If, on the other hand, one increases the rotation speed of the high speed shaft too slowly during start up, heat is not generated very quickly and it may take a significant amount of time to reach the nominal operating state (e.g., increasing the loss of production time). Applicants have discovered that the rotation speed of the high speed shaft can be controlled during a start up procedure based on these considerations relating to internal power losses within the gear box. This results in an improved start up procedure where heating elements in the gear box may not be necessary. Once the gear box reaches a suitable temperature for operating at its nominal state, however, the speed of the high speed shaft may be increased to its nominal operating speed so as to minimize the internal power losses in the gear box and electrical power may be produced by the wind turbine in a more efficient manner.

Figure 3:
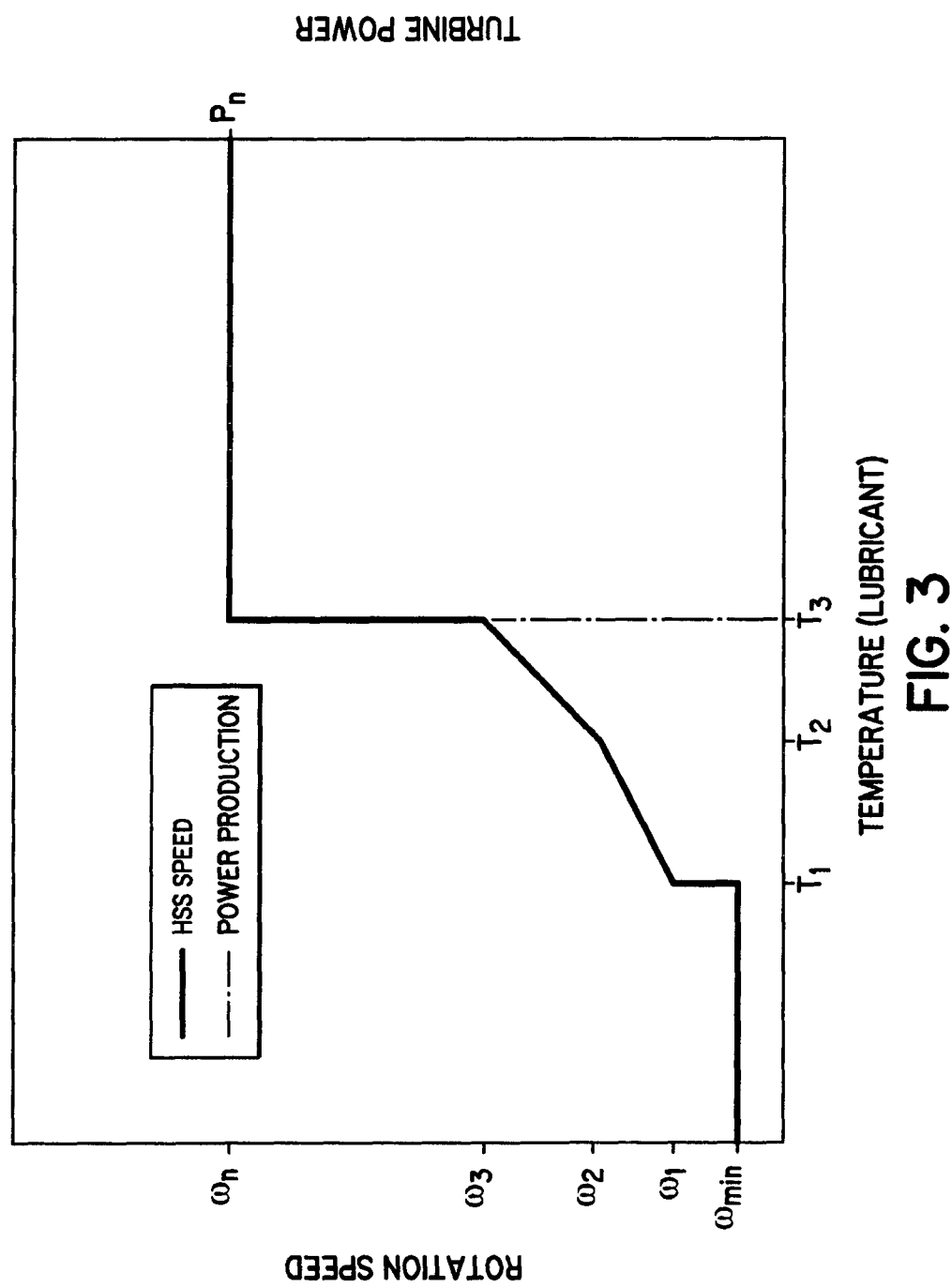
FIG. 3 is a schematic illustration of a start up procedure for a wind turbine in accordance with an embodiment of the invention.

FIG. 3 schematically illustrates a start up procedure in accordance with an exemplary embodiment of the invention. One aspect clearly demonstrated in FIG. 3 is that the warm up period of the gear box 30 occurs before electrical power production from the wind turbine 10 and the providing of the generated electrical power to the electrical grid.

In other words, during the start up period, the wind turbine 10 is not generating any electrical power or delivering any electrical power to the electrical grid. In this regard, in this exemplary embodiment, electrical power production is delayed until the gear box 30 reaches a threshold temperature $T_3$. This value may vary depending on the particular application, location, type of wind turbine, and possibly other factors. Nevertheless, according to an aspect of the invention, the rotor 16 of the wind turbine 10 is permitted to turn so as to generate the internal power losses and warm the gear box 30 to a certain threshold temperature $T_3$ prior to electrical power production or providing electrical power to the grid. Once the temperature of the gear box 30 reaches $T_3$, the wind turbine 10 may be configured to produce electrical power and feed that electrical power to the grid. For example and in one embodiment, when the gear box 30 reaches $T_3$, electrical power produced by the generator 18 may be immediately stepped up to its nominal power $P_n$. It should be realized, however, that other methodologies for ramping electrical power production up to $P_n$ may be implemented.

Another aspect clearly demonstrated in FIG. 3 is that the rotor 16 of the wind turbine 10 may not be completely stopped in severely cold weather. In this regard, many wind turbine operators will bring their wind turbines to a standstill condition when ambient temperatures drop below a certain value $T_{ss}$. For example, some operators may stop their wind turbines (e.g., bring the rotation speed of the rotor to zero) when the ambient temperature reaches a value of about −20° C. This value may also vary depending on the particular application, type of wind turbine, and possibly other factors. Instead, in accordance with an aspect of the invention, and as illustrated in FIG. 3, as temperatures drop below $T_{ss}$, the rotor 16 may be permitted to turn at some low, minimal amount.

This may be referred to as a near stand-still condition. For example, the rotor 16 may be permitted to rotate at a rate of less than 2 revolutions per minute (rpm), and preferably at or less than about 1 rpm. Depending on the particular gear box arrangement, this may result in a minimal rotation of the high speed shaft $\omega_{min}$. With an understanding of the internal power losses occurring in the gear box 30, it is believed that the internal power losses that occur at this rotational speed are at least the same as that provided by conventional heaters used in current gear box designs. Thus, it is believed that the heaters do not have to be used at all during the start up procedure. It is also believed that instead of bringing a wind turbine to a stand-still when the ambient temperature is at or below $T_{ss}$, the rotor 16 should be allowed to rotate at a minimal rate.

In further reference to FIG. 3, the rotor 16 is permitted to rotate at the minimal rate until the temperature in the gear box 30 reaches a certain threshold temperature $T_1$. Depending on the climate, this temperature may be the same as the stand still temperature $T_{ss}$ that currently guides many wind turbine operators or may be slightly higher than this temperature. Assuming that an operator wants to produce electricity whenever possible, then in the normal course, these two temperatures may be about the same. In any event, at $T_1$ the speed of the high speed shaft may be stepped up to a first rotational speed $\omega_1$. This step in rotation speed of the high speed shaft may be achieved by controlling the rotor 16, such as through blade pitching, braking, etc. The first rotational speed $\omega_1$ may be considerably less than the speed of the high speed shaft at its nominal operating state $\omega_n$, and in an exemplary embodiment may be between about 5% and about 15% of its value at the nominal operating state. In one embodiment, for example, the first rotational speed $\omega_1$ may be about 200 rpm. Other values, however, are also possible in alternative embodiments.

In accordance with an aspect of the invention, at least during a portion of the start up to the nominal operating state, heat generation within the gear box 30 may be optimized. More particularly, in an exemplary embodiment, the heat generation in the gear box 30 may be optimized by maximizing the internal power losses occurring in the gear box 30 during start up. The internal power losses may be maximized by controlling the rotational speed of the rotor 16, which in turn controls the rotational speed of the high speed shaft. As noted above, this control over the rotational speed of the rotor 16 may be achieved in several ways including blade pitching, braking, and other control processes known to those of ordinary skill in the art. The primary difference here is that the control of the wind turbine rotor 16 is based on maximizing the internal power losses in the gear box 30 during start up.

In this regard, the speed of the high speed shaft may be controllably varied so as to optimize heat generation within the gear box 30. In one embodiment, this may be achieved through a specific relationship between the rotation speed of the high speed shaft and the temperature of the gear box 30. In an exemplary embodiment, there may be a substantially linear relationship between the speed of the high speed shaft and the temperature of the gear box 30. It is in this region where the benefits of the present invention may be realized.

In this regard, it is in this region where the internal power losses in the gear box 30 are substantially maximized through rotor control so as to optimize heat generation within the gear box 30. The optimized heat generation in the gear box 30 increases the rate at which the gear box 30 warms up and ultimately decreases the time at which the wind turbine 10 can be operated at its nominal power producing state.

As illustrated in FIG. 3, the substantially linear relationship between the speed of the high speed shaft and the temperature of the gear box 30 does not have to remain constant during the start up period. By way of example, the slope of the substantially linear relationship may vary during the start up period. In this regard and in an exemplary embodiment, when the temperature of the gear box 30 reaches a second threshold temperature $T_2$, the speed of the high speed shaft may be denoted $\omega_2$, which while being greater than the first rotational speed $\omega_1$, still remains considerably less than the rotational speed of the high speed shaft at the nominal operating state $\omega_n$. In an exemplary embodiment, the second rotational speed $\omega_2$ of the high speed shaft may be between about 20% and 30% of its value at the nominal operating state. In one embodiment, for example, the second rotational speed $\omega_2$ may be about 400 rpm. This value, however, may vary in alternative embodiments.

In any event, at $T_2$ the speed of the high speed shaft may be increased more aggressively as the temperature of the gear box 30 increases. In other words, while still having a substantially linear relationship between the speed of the high speed shaft and the temperature of the gear box 30, the slope may be increased. Again, during this time the internal power losses occurring in the gear box warm the gear box 30.

In an exemplary embodiment, this optimization in the heat generation in the gear box 30 may occur until the gear box 30 reaches a third threshold temperature $T_3$, which may be the temperature at which the high speed shaft can be operated at its nominal operating speed $\omega_n$. The particular value of $T_3$ may depend on the specific application, type of wind turbine, and/or other factors. This temperature effectively ends the start up period. Accordingly, at this point it is no longer desirable to maximize the internal power losses in the gear box 30. Those internal power losses served their intended purpose of efficiently warming the gear box 30. However, once the gear box 30 is warmed, the internal power losses in the gear box should be minimized so as to increase the electrical power production efficiency of the wind turbine 10.

Thus, in accordance with an embodiment of the invention, when the gear box 30 reaches this threshold temperature $T_3$, the rotational speed of the high speed shaft $\omega_3$ may be stepped up to its nominal operating speed $\omega_n$ and maintained at this value during normal operation of the wind turbine 10. In an exemplary embodiment, the rotational speed of the high speed shaft may be greater than about 60% of the shaft's nominal operating speed when the temperature of the gear box 30 reaches the third threshold temperature $T_3$. As discussed above, increasing and maintaining the rotational speed of the high speed shaft at the shaft's nominal operating speed causes the internal power losses in the gear box 30 to decrease, as illustrated in FIG. 2.

In one embodiment, the optimization of the heat generation in the gear box 30 achieved by maximizing internal power losses in the gear box 30 may occur for substantially the entire portion of the start up of the wind turbine 10 to its nominal operating state. By way of example, in the exemplary embodiment shown in FIG. 3, this optimization occurred from $T_1$ to $T_3$ and included two regions where a substantially linear relationship was established. It should be realized that other scenarios are possible. For example, the optimization of the heat generation in the gear box 30 achieved by maximizing internal power losses in the gear box may occur for only a portion of the start up of the wind turbine 10 to its nominal operating state. In this regard, in one alternative embodiment, the speed of the high speed shaft may be stepped up to $\omega_1$ at $T_1$ and held constant until the temperature of the gear box reaches an intermediate threshold temperature (e.g., between $T_1$ and $T_2$) at which time controlling the rotor 16 so as to produce the substantially linear relationship between the rotation speed of the high speed shaft and the temperature of the gear box 30 may be initiated. Additionally, while two substantially linear regions are shown in FIG. 3, there may be just one substantially linear relationship region or more than two (e.g., three or four substantially linear regions). In any event, optimization should occur for at least a portion of the start up to the nominal operating state, and preferably, for a substantial portion of the start up process.

As illustrated in FIG. 3 and in accordance with another aspect of the invention, electrical power production by the wind turbine 10 may not begin with rotation of the rotor 16 and rotation of the high speed shaft. Instead, much of the warm up of the wind turbine 10, and in particular the gear box 30, may be permitted to occur prior to power production. In an exemplary embodiment, for example, the heat generation optimization is configured to occur prior to power production. More particularly, when the temperature of the gear box reaches the third threshold temperature $T_3$, which in the exemplary embodiment defines the end of the heat generation optimization (i.e., the end of the substantially linear relationship) and the high speed shaft is stepped up to its nominal operating speed $\omega_n$, electrical power production from the wind turbine and the supply of electrical power to the grid may be initiated. In an exemplary embodiment, electrical power production may be immediately stepped up to its nominal operating output $P_n$. The reason that the electrical power production may be immediately stepped up to its nominal operating output $P_n$ is that the gear box 30 has been sufficiently warmed prior to electrical power production and the supply of the generated electrical power to the grid. It should be realized that during the early stages of electrical power production, the internal power losses occurring in the gear box 30 are decreasing in accordance with that shown in FIG. 2. Accordingly, a short time after the nominal operating power output $P_n$ is reached, the internal power losses occurring in the gear box 30 should be substantially minimized so that efficient electrical power production may be achieved.

Aspects of the present invention may also be used at other times during operation of the wind turbine 10. In this regard, after a period of operation at the nominal operating electrical power output $P_n$, sometimes low wind conditions may set in that cause the wind turbine 10 to be taken off the grid and electrical power production temporarily stopped or interrupted. In these lower wind conditions (e.g., at wind speeds less than about 7 mph), many wind turbine operators provide just minimal rotation of the rotor 16 (e.g., $\omega_{min}$) just waiting for the wind to increase again. In other words, while the low wind conditions would allow for a certain rotation of the rotor 16 higher than the minimal rotation speed, the rotation speed is simply dropped down to the minimal rotation speed regardless of what the low wind conditions would allow. Due to the cold climate environment and the minimal rotation speed, the gear box may start to cool off and decrease in temperature. If the low wind conditions exist for a substantial period of time, the gear box may cool off to the point where another start up period may have to be initiated prior to electrical power production. This may constitute an inefficient use of possible production time and loss of potential revenue.

In accordance with another aspect of the invention, heat generation within the gear box 30 may be optimized by maximizing the internal power losses occurring in the gear box 30 during the low wind conditions. In this way, when the wind increases to the point that the wind turbine 10 may once again produce electrical power (i.e., the period of low wind conditions has terminated), the wind turbine 10 may be immediately placed in a power production mode and connected to the electrical grid to reestablish a supply of electrical power from the wind turbine 10 to the grid without going through another warm up period. In other words, the method in accordance with an aspect of the invention is to generate heat in the gear box 30 during low wind conditions in order to keep the gear box sufficiently warm so that the wind turbine 10 may be instantly ready to produce electrical power and connect to the grid when wind conditions increase. This may be achieved by optimizing heat generation in the gear box during these low wind conditions. Simultaneous with or just prior to electrical power production, the rotation speed of the high speed shaft may be increased to its nominal operating speed $\omega_n$ so as to minimize the internal losses in the gear box 30 as the wind turbine starts producing electrical power at its nominal operating output $P_n$.

It is believed that by obtaining a better understanding of the internal power losses occurring inside the gear box during start up, an improved start up procedure may be obtained. One outcome of this greater understanding is that the effect of the heaters on warming the gear box during start up has been significantly over estimated. Applicants have discovered that the overall effect of the heaters on the warming of the gear box during start up is relatively small in comparison to the heat generated by internal power losses occurring in the gear box. Accordingly, one aspect of the invention is to provide a method for starting a wind turbine in a cold climate environment which does not use heaters, as in conventional gear box designs. Instead, in an exemplary embodiment, only the energy resulting from rotation of the rotor, at least a portion of which is transferred to heat, is used to warm the gear box.

The removal of the external heaters will reduce the costs associated with the gear box, and thus reduce the overall costs of the wind turbine.

Applicants have also discovered that the internal power losses occurring in the gear box generally track with the rotational speed of the high speed shaft and that the power and torque have minimal effect on the losses (i.e., the internal power losses are primarily driven by the rotational speed of the transmission components). However, Applicants have also discovered that increasing the rotational speed of the high speed shaft too quickly actually causes the internal power losses in the gear box to start decreasing, thus reducing the warming of the gear box during start up. These discoveries have led to the conclusion that there may be an improved process for wind turbine start up. This process optimizes heat generation within the gear box and, in an exemplary embodiment, may be achieved by maximizing the internal power losses occurring in the gear box during start up. This optimization via internal power losses reduces the time for the gear box to reach a threshold operating temperature at which electrical power production and the supply of electrical power to the grid may be initiated, thereby allowing the wind turbine to come on line more quickly. Once an acceptable operating temperature of the gear box is reached (i.e., the warming process is substantially complete), the internal power losses in the gear box should be minimized so as to allow the wind turbine to operate more efficiently.

Applicants have further discovered that aspects of the present invention may also be used in low wind conditions in cold climate environments after a period of operation. In this regard, during low wind conditions, heat generation within the gear box may be optimized through maximizing internal power losses in the gear box. This heat generation keeps the gear box sufficiently warm such that when wind conditions increase again, the wind turbine may be immediately placed in an electrical power production mode without executing another starting sequence.

While the present invention has been illustrated by a description of various preferred embodiments and while these embodiments have been described in some detail, it is not the intention of the inventors to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A method of starting a wind turbine in a cold climate environment from a stand-still or near stand-still condition, the wind turbine having a tower, a rotor with at least one blade, a generator for producing electrical power, and a gear box having a main shaft operatively coupled to the rotor and a high speed shaft operatively coupled to the generator, the wind turbine being configured to be operatively connected to an electrical grid, the method comprising:
performing a start up period, wherein the rotation speed of the rotor is controlled to increase and wherein the wind turbine is not delivering any electrical power to the electrical grid during the start up period;
providing heat generation within the gear box by increasing the rotation speed until the gear box has reached a threshold temperature; and
delivering electrical power generated using the wind turbine to the electrical grid when the temperature of the gear box reaches the threshold temperature.

2. The method according to claim 1, wherein heat generation within the gear box comprises maximizing internal power losses in the gear box.

3. The method according to claim 2, wherein controlling the rotation speed of the rotor so as to maximize the internal power losses in the gear box further comprises controlling the rotation speed of the rotor according to a substantially linear relationship between a rotation speed of the high speed shaft and the gear box temperature.

4. The method according to claim 3, further comprising controlling the rotation speed in a first region of the start up according to a substantially linear relationship between the rotation speed of the high speed shaft and the gear box temperature characterized by a first slope, and controlling the rotation speed in a second region of the start up according to a substantially linear relationship between the rotation speed of the high speed shaft and the gear box temperature characterized by a second slope, wherein the first and second slopes are different from each other.

5. The method according to claim 3, wherein controlling the rotation speed of the rotor according to the substantially linear relationship between the rotation speed of the high speed shaft and the gear box temperature terminates when the gear box reaches a first threshold temperature.

6. The method according to claim 5, wherein the rotation speed of the high speed shaft is greater than about 60% of a nominal operating speed of the high speed shaft when the temperature of the gear box reaches the first threshold temperature.

7. The method according to claim 5, further comprising increasing the rotation speed of the high speed shaft up to a nominal operating speed when the temperature of the gear box reaches the first threshold temperature.

8. The method according claim 5, wherein the power production of the wind turbine is increased up to a nominal power output when the temperature of the gear box reaches the first threshold temperature.

9. The method according to claim 1, further comprising reducing the internal power losses in the gear box after delivery of electrical power to the electrical grid has begun.

10. The method according to claim 1, wherein the heat generation in the gear box is achieved using only the energy resulting from the rotation of the rotor.

11. The method according to claim 1, wherein the heat generation in the gear box is achieved without the use of external heaters.

12. A method of starting a wind turbine in a cold climate environment, comprising:
providing a wind turbine in a cold climate environment in a stand-still or near stand-still condition, the wind turbine having a tower, a rotor with at least one blade, a generator for producing electrical power, and a gear box having a main shaft operatively coupled to the rotor and a high speed shaft operatively coupled to the generator, the wind turbine configured to be operatively connected to an electrical grid;
allowing the rotation speed of the rotor to increase during start up of the wind turbine;
with the rotor turning and prior to the wind turbine providing electrical power to the electrical grid, increasing the temperature of the gear box up to a first threshold temperature without the use of external heaters; and
generating electrical power using the wind turbine after the temperature of the gear box has reached the first threshold temperature.

13. The method according to claim 12, further comprising maximizing the internal power losses in the gear box so as to increase the temperature of the gear box up to the first threshold temperature.

14. The method according to claim 13, wherein maximizing the internal power losses in the gear box further comprises controlling the speed of the rotor according to a substantially linear relationship between a rotation speed of the high speed shaft and the gear box temperature.

15. The method according to claim 12, further comprising reducing the internal power losses in the gear box after the temperature of the gear box reaches the first threshold temperature.

16. A method of operating a wind turbine in a cold climate environment in a fully operating state, the wind turbine having a tower, a rotor with at least one blade, a generator for producing electrical power, and a gear box having a main shaft operatively coupled to the rotor and a high speed shaft operatively coupled to the generator, the wind turbine providing electrical power to an electrical grid when in the fully operating state, the method comprising:

interrupting the supply of electrical power from the wind turbine to the electrical grid during a period of low wind conditions;

providing heat generation within the gear box during the period of low wind conditions by controlling the rotation speed of the rotor above a minimal rotation speed of the rotor; and reestablishing the supply of electrical power from the wind turbine to the electrical grid once the period of low wind conditions has terminated.

17. The method according to claim 16, wherein the supply of electrical power from the wind turbine to the electrical grid is reestablished without executing a start up sequence for the wind turbine.

* * * * *